US012468941B2

(12) United States Patent
Wulfe et al.

(10) Patent No.: US 12,468,941 B2
(45) Date of Patent: Nov. 11, 2025

(54) SYSTEMS AND METHODS FOR DYNAMICS-AWARE COMPARISON OF REWARD FUNCTIONS

(71) Applicant: Toyota Research Institute, Inc., Los Altos, CA (US)

(72) Inventors: Blake Warren Wulfe, San Francisco, CA (US); Rowan McAllister, Los Altos, CA (US); Adrien David Gaidon, Mountain View, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 939 days.

(21) Appl. No.: 17/570,468

(22) Filed: Jan. 7, 2022

(65) Prior Publication Data
US 2023/0104027 A1    Apr. 6, 2023

Related U.S. Application Data

(60) Provisional application No. 63/251,953, filed on Oct. 4, 2021.

(51) Int. Cl.
*G06N 3/08* (2023.01)
(52) U.S. Cl.
CPC ...................................... *G06N 3/08* (2013.01)
(58) Field of Classification Search
CPC ......................................................... G06N 3/08
See application file for complete search history.

(56) References Cited

U.S. PATENT DOCUMENTS

| 2018/0088571 A1* | 3/2018 | Weinstein-Raun ........................ G05D 1/0088 |
| 2020/0074236 A1* | 3/2020 | Mase ..................... G06F 18/217 |
| 2020/0346666 A1* | 11/2020 | Wray ................... G05D 1/0221 |

FOREIGN PATENT DOCUMENTS

| CN | 114662639 B | * | 6/2022 | ............. G06N 3/045 |
| WO | 2020159692 A1 | | 8/2020 | |

OTHER PUBLICATIONS

Gleave et al., Quantifying Differences in Reward Functions (Year: 2021).*

(Continued)

*Primary Examiner* — Usmaan Saeed
*Assistant Examiner* — Jacqueline C. Meyer
(74) *Attorney, Agent, or Firm* — Christopher G. Darrow; Darrow Mustafa PC (57) ABSTRACT

Systems and methods described herein relate to dynamics-aware comparison of reward functions. One embodiment generates a reference reward function; computes a dynamics-aware transformation of the reference reward function based on a transition model of an environment of a robot; computes a dynamics-aware transformation of a first candidate reward function based on the transition model; computes a dynamics-aware transformation of a second candidate reward function based on the transition model; selects, as a final reward function, the first or second candidate reward function based on which is closer to the reference reward function as measured by pseudometrics computed between their respective dynamics-aware transformations and the dynamics-aware transformation of the reference reward function; and optimizes the final reward function to control, at least in part, operation of the robot.

20 Claims, 3 Drawing Sheets

(56) References Cited

OTHER PUBLICATIONS

Cabi et al., Scaling data-driven robotics with reward sketching and batch reinforcement learning (Year: 2020).*
Arora et al., A Survey of Inverse Reinforcement Learning: Challenges, Methods, and Progress (Year: 2020).*
Aliev et al., Proposal of a Monitoring System for Collaborative Robots to Predict Outages and to Assess Reliability Factors Exploiting Machine Learning (Year: 2021).*
Pieter Abbeel et al. Apprenticeship learning via inverse reinforcement learning. In International Conference on Machine Learning, pp. 1, 2004.
Greg Brockman, Vicki Cheung, Ludwig Pettersson, Jonas Schneider, John Schulman, Jie Tang, and Wojciech Zaremba. OpenAI Gym. arXiv preprint arXiv:1606.01540, 2016.
Serkan Cabi, Sergio Gomez Colmenarejo, Alexander Novikov, Ksenia Konyushkova, Scott Reed, Rae Jeong, Konrad Zolna, Yusuf Aytar, David Budden, Mel Vecerik, et al. Scaling data-driven robotics with reward sketching and batch reinforcement learning. arXiv preprint arXiv:1909.12200, 2019.
Paul Christiano, Jan Leike, Tom B Brown, Miljan Martic, Shane Legg, and Dario Amodei. Deep reinforcement learning from human preferences. arXiv preprint arXiv:1706.03741, 2017.
Miroslav Dudik, John Langford, and Lihong Li. Doubly robust policy evaluation and learning. arXiv preprint arXiv:1103.4601, 2011.
Justin Fu, Katie Luo, and Sergey Levine. Learning robust rewards with adversarial inverse reinforcement learning. arXiv preprint arXiv:1710.11248, 2017.
Adam Gleave, Michael Dennis, Shane Legg, Stuart Russell, and Jan Leike. Quantifying differences in reward functions. arXiv preprint arXiv:2006.13900, 2020.
Jessica E Holland, Mykel J Kochenderfer, and Wesley A Olson. Optimizing the next generation collision avoidance system for safe, suitable, and acceptable operational performance. Air Traffic Control Quarterly, 21(3):275-297, 2013.
Alex Irpan, Kanishka Rao, Konstantinos Bousmalis, Chris Harris, Julian Ibarz, and Sergey Levine. Off-policy evaluation via off-policy classification. arXiv preprint arXiv:1906.01624, 2019.
Nan Jiang and Lihong Li. Doubly robust off-policy value evaluation for reinforcement learning. arXiv preprint arXiv:1511.03722, 2016.
Diederik P Kingma and Jimmy Ba. Adam: A method for stochastic optimization. arXiv preprint arXiv:1412.6980, 2014.
W Bradley Knox, Alessandro Allievi, Holger Banzhaf, Felix Schmitt, and Peter Stone. Reward (mis)design for autonomous driving. arXiv preprint arXiv:2104.13906, 2021.
Hoang M. Le, Cameron Voloshin, and Yisong Yue. Batch policy learning under constraints. arXiv preprint arXiv:1903.08738, 2019.
Donghun Lee, Srivatsan Srinivasan, and Finale Doshi-Velez. Truly batch apprenticeship learning with deep successor features. arXiv preprint arXiv:1903.10077, 2019.
Eric Liang, Richard Liaw, Robert Nishihara, Philipp Moritz, Roy Fox, Ken Goldberg, Joseph Gonzalez, Michael Jordan, and Ion Stoica. Rllib: Abstractions for distributed reinforcement learning. In International Conference on Machine Learning, pp. 3053-3062. PMLR, 2018.
Volodymyr Mnih, Koray Kavukcuoglu, David Silver, Alex Graves, Ioannis Antonoglou, DaanWierstra, and Martin Riedmiller. Playing Atari with deep reinforcement learning. arXiv preprint arXiv:1312.5602, 2013.
Andrew Y Ng, Daishi Harada, and Stuart Russell. Policy invariance under reward transformations: Theory and application to reward shaping. In International Conference on Machine Learning, vol. 99, pp. 278-287, 1999.
Andrew Y Ng, H Jin Kim, Michael I Jordan, Shankar Sastry, and Shiv Ballianda. Autonomous helicopter flight via reinforcement learning. In Neural Information Processing Systems, vol. 16. Citeseer, 2003.
Cosmin Paduraru. Off-policy evaluation in Markov decision processes. PhD thesis, McGill University, 2013.
Adam Paszke, Sam Gross, Francisco Massa, Adam Lerer, James Bradbury, Gregory Chanan, Trevor Killeen, Zeming Lin, Natalia Gimelshein, Luca Antiga, et al. Pytorch: An imperative style, high-performance deep learning library. Neural Information Processing Systems, 32:8026-8037, 2019.
Doina Precup, Richard S. Sutton, and Satinder P. Singh. Eligibility traces for off-policy policy evaluation. In International Conference on Machine Learning, pp. 759-766, San Francisco, CA, USA, 2000. Morgan Kaufmann Publishers Inc.
John Schulman, Philipp Moritz, Sergey Levine, Michael Jordan, and Pieter Abbeel. Highdimensional continuous control using generalized advantage estimation. arXiv preprint arXiv:1506.02438, 2015.
John Schulman, Filip Wolski, Prafulla Dhariwal, Alec Radford, and Oleg Klimov. Proximal policy optimization algorithms. arXiv preprint arXiv:1707.06347, 2017.
David Silver, Julian Schrittwieser, Karen Simonyan, Ioannis Antonoglou, Aja Huang, Arthur Guez, Thomas Hubert, Lucas Baker, Matthew Lai, Adrian Bolton, et al. Mastering the game of Go without human knowledge. nature, 550(7676):354-359, 2017.
Gerald Tesauro. Temporal difference learning and TD-Gammon. Communications of the ACM, 38 (3):58-68, 1995.
Devinder Thapa, In-Sung Jung, and Gi-Nam Wang. Agent Based Decision Support System Using Reinforcement Learning Under Emergency Circumstances, vol. 3610. 2005.
Emanuel Todorov, Tom Erez, and Yuval Tassa. Mujoco: A physics engine for model-based control. In International Conference on Intelligent Robots and Systems, pp. 5026-5033. IEEE, 2012.
Cameron Voloshin, Hoang M. Le, Nan Jiang, and Yisong Yue. Empirical study of off-policy policy evaluation for reinforcement learning. arXiv preprint arXiv:1911.06854, 2020.
Brian D Ziebart, Andrew L Maas, J Andrew Bagnell, Anind K Dey, et al. Maximum entropy inverse reinforcement earning. In AAAI Conference on Artificial Intelligence, vol. 8, pp. 1433-1438. Chicago, IL, USA, 2008.
A. Gleave et al., "Quantifying Differences in Reward Functions," arXiv:2006.13900v3 [cs.LG] Mar. 17, 2021, available at https://arxiv.org/pdf/2006.13900.pdF.
E. Michaud, A. Gleave, and S. Russell, "Understanding Learned Reward Functions," arXiv:2012.05862v1 [cs.LG], Dec. 10, 2020, found at https://arxiv.org/pdf/2012.05862.pdf.
M. Wulfmeier et al., "Maximum Entropy Deep Inverse Reinforcement Learning," arXiv:1507.04888v3 [cs.LG], Mar. 11, 2016, available at https:/arxiv.org/pdf/1507.04888_pdf.
M. Wulfmeier et al., "Large-Scale Cost Function Learning for Path Planning Using Deep Inverse Reinforcement Learning," The International Journal of Robotics Research, 2017, available at https://static1.squarespace.com/static/5e0f485abd9c76034e868fdf/t/5fbad59fd89f9c062768362a/1606079914910/IJRR2017.pdf.
B. Ziebart, "Maximum Entropy Inverse Reinforcement Learning," Proceedings of the Twenty-Third AAAI Conference on Artificial Intelligence (2008), available at https://www.aaai.org/Papers/AAAI/2008/AAAI08-227.pdf?source=post_page.

* cited by examiner

SYSTEMS AND METHODS FOR DYNAMICS-AWARE COMPARISON OF REWARD FUNCTIONS

CROSS-REFERENCE TO RELATED APPLICATION

This application claims the benefit of U.S. Provisional Patent Application No. 63/251,953, "Dynamics-Aware Comparison of Learned Reward Functions," filed on Oct. 4, 2021, which is incorporated by reference herein in its entirety.

TECHNICAL FIELD

The subject matter described herein relates in general to machine learning and, more specifically, to systems and methods for dynamics-aware comparison of reward functions.

BACKGROUND

Autonomous control is central to a variety of robotics applications, including, for example, autonomous vehicles, service robots, delivery robots, rescue robots, and aerial drones. High-level decision making in these contexts is challenging due to the wide variety of situations encountered in the real world. For example, an autonomous vehicle has to be able to navigate to a destination, stay on the roadway within the correct lane, negotiate busy intersections, recognize and avoid obstacles, operate in accordance with traffic laws, etc. Due to this diversity of situations and the associated complexity, traditional expert or rule-based decision making systems scale poorly and do not always perform well.

Machine learning has become a popular solution to the challenges of autonomous control. For example, a decision-making system can be designed that learns from human demonstrations, from synthetic data, or from a combination thereof. Decision making systems often rely on "reward functions," which serve as the immediate optimization objective such systems attempt to maximize. A reward function defines "good" and "bad" behavior. For example, in the autonomous-driving context, a reward function might define collisions and violating traffic laws as "bad" (quantified by a numeric value associated with those events) and reaching a goal destination as "good." Defining reward functions for real-world robotics tasks such as autonomous driving is extremely challenging. Consequently, there is a large body of research focusing on learning reward functions from data (particularly from demonstrations of experts performing a task).

Another challenge associated with reward functions is evaluating the quality of a reward function or, in the case of a learned reward function, the algorithm used to learn the reward function. This can sometimes involve comparing and quantifying the differences between reward functions. Conventional techniques for comparing reward functions sometimes produce less than satisfactory results, particularly with learned reward functions.

SUMMARY

An example of a system for dynamics-aware comparison of reward functions is presented herein. The system comprises one or more processors and a memory communicably coupled to the one or more processors. The memory stores a reference generation module including instructions that when executed by the one or more processors cause the one or more processors to generate a reference reward function. The memory also stores a transformation module including instructions that when executed by the one or more processors cause the one or more processors to compute a dynamics-aware transformation of the reference reward function based on a transition model of an environment of a robot. The transition model maps a state and action to a probability distribution over next states. The transformation module also includes instructions that when executed by the one or more processors cause the one or more processors to compute a dynamics-aware transformation of a first candidate reward function based on the transition model of the environment of the robot. The transformation module also includes instructions that when executed by the one or more processors cause the one or more processors to compute a dynamics-aware transformation of a second candidate reward function based on the transition model of the environment of the robot. The memory also stores a comparison module including instructions that when executed by the one or more processors cause the one or more processors to select, as a final reward function, one of the first candidate reward function and the second candidate reward function based on which of the first candidate reward function and the second candidate reward function is closer to the reference reward function as measured by a first pseudometric computed between the dynamics-aware transformation of the first candidate reward function and the dynamics-aware transformation of the reference reward function and a second pseudometric computed between the dynamics-aware transformation of the second candidate reward function and the dynamics-aware transformation of the reference reward function. The memory also stores an optimization module including instructions that when executed by the one or more processors cause the one or more processors to optimize the final reward function to control, at least in part, operation of the robot.

Another embodiment is a non-transitory computer-readable medium for dynamics-aware comparison of reward functions and storing instructions that when executed by one or more processors cause the one or more processors to generate a reference reward function. The instructions also cause the one or more processors to compute a dynamics-aware transformation of the reference reward function based on a transition model of an environment of a robot. The transition model maps a state and action to a probability distribution over next states. The instructions also cause the one or more processors to compute a dynamics-aware transformation of a first candidate reward function based on the transition model of the environment of the robot. The instructions also cause the one or more processors to compute a dynamics-aware transformation of a second candidate reward function based on the transition model of the environment of the robot. The instructions also cause the one or more processors to select, as a final reward function, one of the first candidate reward function and the second candidate reward function based on which of the first candidate reward function and the second candidate reward function is closer to the reference reward function as measured by a first pseudometric computed between the dynamics-aware transformation of the first candidate reward function and the dynamics-aware transformation of the reference reward function and a second pseudometric computed between the dynamics-aware transformation of the second candidate reward function and the dynamics-aware transformation of the reference reward function. The instructions also cause the one or more processors to optimize the final reward function to control, at least in part, operation of the robot.

Another embodiment is a method of dynamics-aware comparison of reward functions, the method comprising generating a reference reward function. The method also includes computing a dynamics-aware transformation of the reference reward function based on a transition model of an environment of a robot. The transition model maps a state and action to a probability distribution over next states. The method also includes computing a dynamics-aware transformation of a first candidate reward function based on the transition model of the environment of the robot. The method also includes computing a dynamics-aware transformation of a second candidate reward function based on the transition model of the environment of the robot. The method also includes selecting, as a final reward function, one of the first candidate reward function and the second candidate reward function based on which of the first candidate reward function and the second candidate reward function is closer to the reference reward function as measured by a first pseudometric computed between the dynamics-aware transformation of the first candidate reward function and the dynamics-aware transformation of the reference reward function and a second pseudometric computed between the dynamics-aware transformation of the second candidate reward function and the dynamics-aware transformation of the reference reward function. The method also includes optimizing the final reward function to control, at least in part, operation of the robot.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

One well-known approach to evaluating reward functions involves learning a policy using a reward function and comparing the resulting policy with a policy learned using a different reward function. This technique is sometimes referred to in the literature as the "rollout" strategy. As those skilled in the art are aware, different reward functions are equivalent when the policies learned on those reward functions are equivalent. Another known approach to evaluating reward functions converts reward functions to a "canonical form" enabling differences between the reward functions that do not impact the policies learned on those reward functions to be identified and accounted for. Though this approach has the advantage of being able to directly compare reward functions, avoiding the need to first learn policies on the reward functions, the canonicalization process samples triples (state, action, next state) that are not possible under the distribution of the dataset. This is particularly problematic for learned reward functions because they tend not work well on out-of-distribution (OOD) samples.

In various embodiments described herein, a dynamics-aware reward function comparison system overcomes the drawbacks of conventional reward-function comparison methods by converting reward functions to be compared to a different canonical form that incorporates a transition model. The transition model models the dynamics of the environment in which a robot functions. Use of the transition model reduces or avoids altogether OOD evaluation of learned reward functions. This significantly improves the performance of the dynamics-aware reward function comparison system in comparing learned reward functions, in particular, though the same techniques can also be applied to closed-form reward functions.

In various embodiments, a dynamics-aware reward function comparison system generates a reference reward function for comparison purposes. In some embodiments, the reference reward function is generated by labeling a relatively small portion of a large dataset. In various embodiments, the system computes a dynamics-aware transformation of each of the following: (1) the reference reward function, (2) a first candidate reward function, and (3) a second candidate reward function. These dynamics-aware transformations, which are based on a transition model of the environment of the robot, map a state and action to a probability distribution over next states. The system compares the first and second candidate reward functions with the reference reward function by computing a first pseudometric between the dynamics-aware transformation of the first candidate reward function and the dynamics-aware transformation of the reference reward function and computing a second pseudometric between the dynamics-aware transformation of the second candidate reward function and the dynamics-aware transformation of the reference reward function. The system can select, as a final reward function, the candidate reward function that is closer to the reference reward function, as measured by the first and second pseudometrics. In some embodiments, one or both of the candidate reward functions are learned reward functions. In those embodiments, the learned reward functions can be learned through techniques such as inverse reinforcement learning (IRL).

Once the final reward function has been chosen, the system can optimize the final reward function to control, at least in part, the operation of the target robot. In some embodiments, optimizing the final reward function involves learning an optimized control policy in a parameterized model using the final reward function. In other embodiments, optimizing the final reward function involves including the final reward function in a planning algorithm of the robot. In some embodiments involving a parameterized model, the parameterized model is one or more neural networks. In other embodiments, the parameterized model is a colinear function of a set of features.

The various embodiments described herein have wide applicability to different aspects of a variety of different kinds of robots. For example, in some embodiments, the robot is a manually driven vehicle equipped with an Advanced Driver-Assistance System (ADAS) or other system that performs analytical and decision-making tasks to assist a human driver. In other embodiments, the robot is an autonomous vehicle capable of operating at, e.g., Autonomy Levels 3-5, as defined by the automobile industry. Herein, the term "autonomous vehicle" also includes specialized outdoor robots such as search-and-rescue robots and delivery robots. In still other embodiments, the robot can be a mobile or fixed indoor robot (e.g., a service robot, hospitality robot, companionship robot, manufacturing robot, etc.). In still other embodiments, the robot can be an autonomous or semi-autonomous aerial drone.

The remainder of this description is organized as follows. First, in connection with FIGS. 1 and 2, a high-level overview of various illustrative embodiments is provided. Second, a more detailed explanation of the underlying mathematical concepts and principles is presented. Finally, in connection with FIG. 3, the methods associated with the various embodiments described herein are discussed.

Figure 1:
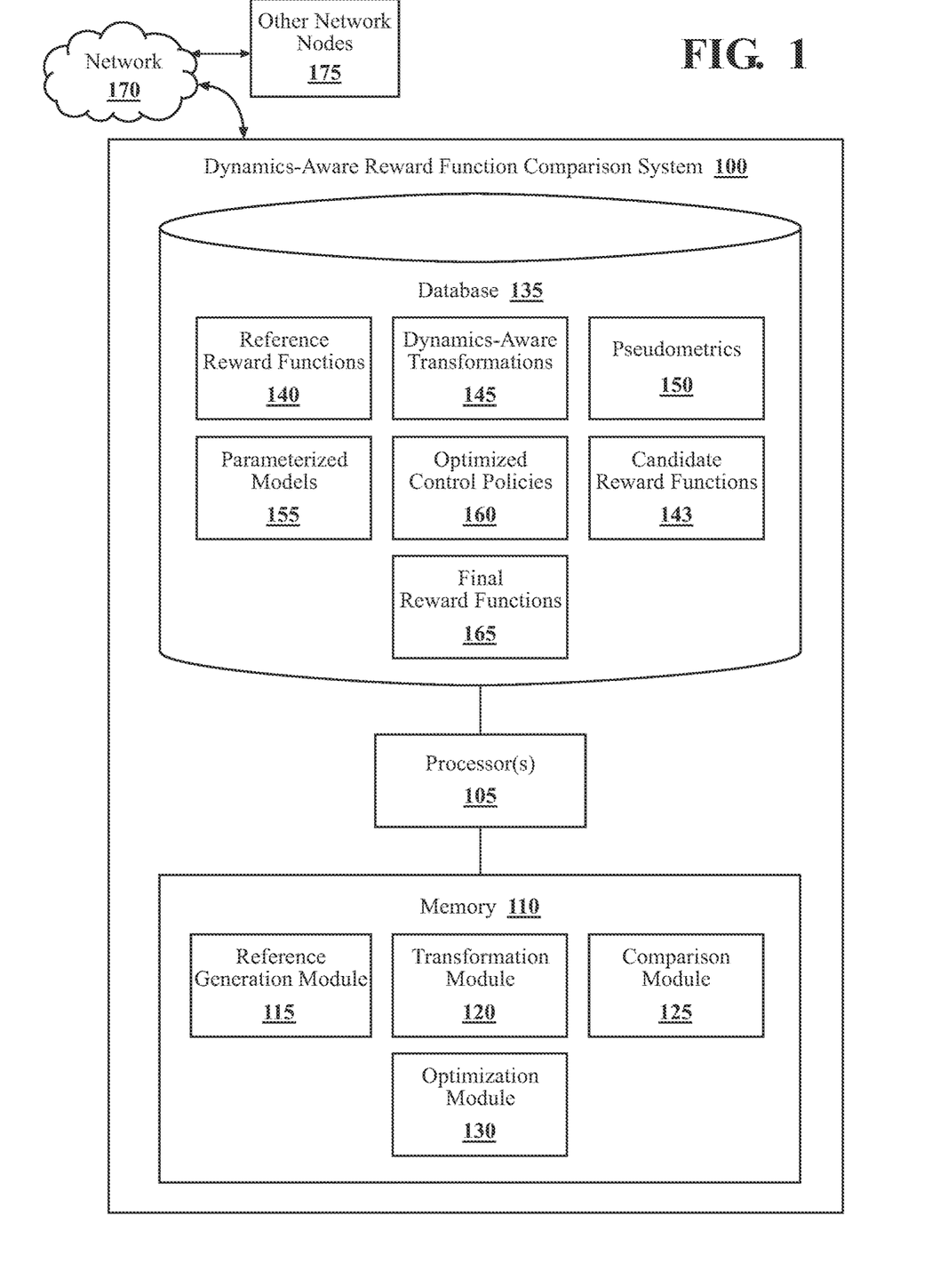
FIG. 1 is a block diagram of a dynamics-aware reward function comparison system, in accordance with an illustrative embodiment of the invention.

Referring to FIG. 1, it is a block diagram of a dynamics-aware reward function comparison system 100 (hereinafter "reward function comparison system 100"), in accordance with an illustrative embodiment of the invention. In some embodiments, reward function comparison system 100 is implemented in a server. In other embodiments, reward function comparison system 100 is implemented in a different type of computing system. In FIG. 1, reward function comparison system 100 is shown as including one or more processors 105. Reward function comparison system 100 also includes a memory 110 communicably coupled to the one or more processors 105. The memory 110 stores a reference generation module 115, a transformation module 120, a comparison module 125, and an optimization module 130. The memory 110 is a random-access memory (RAM), read-only memory (ROM), a hard-disk drive, a flash memory, or other suitable memory for storing the modules 115, 120, 125, and 130. The modules 115, 120, 125, and 130 are, for example, computer-readable instructions that when executed by the one or more processors 105, cause the one or more processors 105 to perform the various functions disclosed herein.

In connection with its tasks, reward function comparison system 100 can store various kinds of data in a database 135. For example, in the embodiment shown in FIG. 1, reward function comparison system 100 stores, in database 135, reference reward functions 140, candidate reward functions 143, dynamics-aware transformations 145, pseudometrics 150, parameterized models 155, optimized control policies 160, and final reward functions 165.

As shown in FIG. 1, reward function comparison system 100 can communicate with other network nodes 175 (servers, client computers, robots, etc.) via a network 170. In some embodiments, network 170 includes the Internet. Network 170 can also include any of a variety of wireless communication technologies (LTE, 5G, WiFi, Bluetooth, etc.).

Reference generation module 115 generally includes instructions that when executed by the one or more processors 105 cause the one or more processors 105 to generate a reference reward function 140. As mentioned above, in some embodiments, the reference reward function 140 is generated by labeling a relatively small portion of a large dataset. For example, in an autonomous-driving application, a small portion of a large dataset containing driving-related data might be labeled to generate the reference reward function 140. The reference reward function 140 represents a baseline for comparison—a "good" reward function against which other candidate reward functions (e.g., learned reward functions) can be compared and evaluated.

Transformation module 120 generally includes instructions that when executed by the one or more processors 105 cause the one or more processors 105 to compute a dynamics-aware transformation 145 of the reference reward function 140 based on a transition model of the environment of a robot (i.e., the environment in which the robot functions). As explained above, the transition model maps a state and action to a probability distribution over next states. Transformation module 120 also includes instructions that when executed by the one or more processors 105 cause the one or more processors 105 to compute a dynamics-aware transformation 145 of a first candidate reward function 143 based on the transition model of the environment of the robot. Transformation module 120 also includes instructions that when executed by the one or more processors 105 cause the one or more processors 105 to compute a dynamics-aware transformation 145 of a second candidate reward function 143 (different from the first candidate reward functions 143) based on the transition model of the environment of the robot. Note that transformation module 120 applies the same kind of dynamics-aware transformation 145 to the reference reward function 140, the first candidate reward function 143, and the second candidate reward function 143. This dynamics-aware transformation 145 is defined mathematically and discussed in greater detail below.

As discussed above, in some embodiments, at least one of the two candidate reward functions is a learned reward function. A variety of methods exist for learning reward functions. Those methods are often categorized based on the form of supervision used. For example, human-labeled preferences between demonstrations can be used to learn reward functions. Rewards can also be labeled on a per-time-step basis, allowing for learning via supervised regression. Alternatively, IRL methods typically assume access to expert demonstrations and attempt to find a reward function under which the expert is uniquely optimal.

Comparison module 125 generally includes instructions that when executed by the one or more processors 105 cause the one or more processors 105 to select, as a final reward function 165, whichever of the first candidate reward function 143 and the second candidate reward function 143 is closer to the reference reward function 140, as measured by a first pseudometric 150 computed between the dynamics-aware transformation 145 of the first candidate reward function 143 and the dynamics-aware transformation 145 of the reference reward function 140 and a second pseudometric 150 computed between the dynamics-aware transformation 145 of the second candidate reward function 143 and the dynamics-aware transformation 145 of the reference reward function 140. In some embodiments, in computing the first and second pseudometrics, comparison module 125 evaluates the reference reward function 140, the first candidate reward function 143, and the second candidate reward function 143 only at physically realizable state transitions. This obviates the problem of OOD samples that plagues some of the conventional approaches to comparing reward functions, as discussed above.

Optimization module 130 generally includes instructions that when executed by the one or more processors 105 cause the one or more processors 105 to optimize the final reward function 165 to control, at least in part, operation of the target robot. The term "optimizing the final reward function 165" can mean different things, depending on the particular embodiment. In some embodiments, it means learning an optimized control policy 160 for a task in a parameterized model 155 using the final reward function 165. For example, in some embodiments, the parameterized model 155 includes one or more neural networks. In other embodiments, the parameterized model 155 includes a colinear function of a set of features. Once the weights and parameters of the parameterized model 155 have been established through a training process, those weights and parameters can be transferred (e.g., transmitted over network 170) to the target robot, and the robot can be controlled, at least in part, in accordance with the optimized control policy 160.

In other embodiments, "optimizing the final reward function 165" means that optimization module 130 includes the final reward function 165 in a planning algorithm of the robot (i.e., in program code that is ultimately transferred to and installed in the robot).

Figure 2:
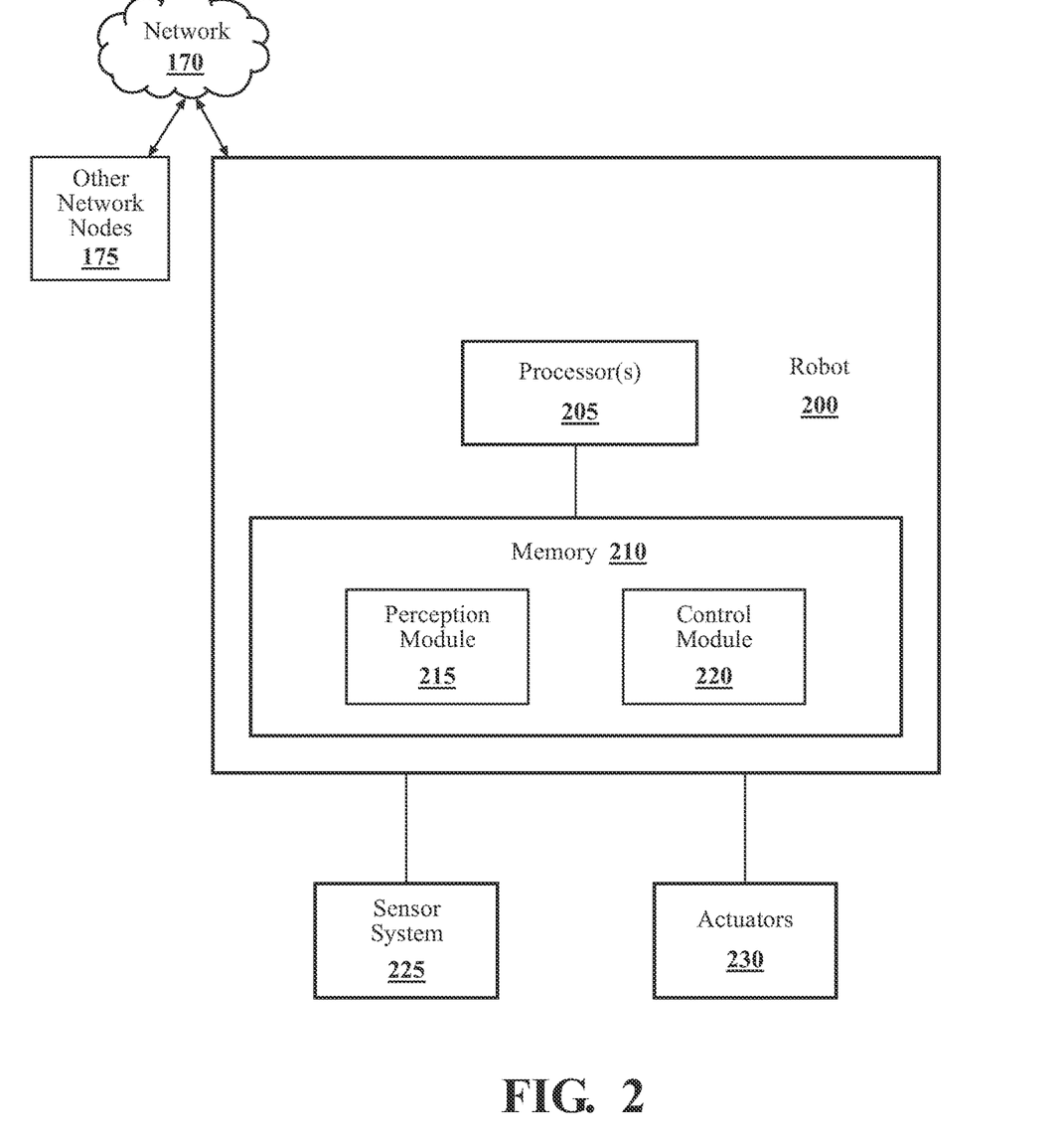
FIG. 2 is a block diagram of a robot, in accordance with an illustrative embodiment of the invention.

FIG. 2 is a block diagram of a robot 200, in accordance with an illustrative embodiment of the invention. In FIG. 2, robot 200 is shown as including one or more processors 205. Robot 200 also includes a memory 210 communicably coupled to the one or more processors 205. The memory 210 stores a perception module 215 and a control module 220. The memory 210 is a random-access memory (RAM), read-only memory (ROM), a hard-disk drive, a flash memory, or other suitable memory for storing the modules 215 and 220. The modules 215 and 220 are, for example, computer-readable instructions that when executed by the one or more processors 205, cause the one or more processors 205 to perform the various functions disclosed herein. More specifically, perception module 215 generally includes instructions that when executed by the one or more processors 205 cause the one or more processors 205 to analyze and perceive the environment surrounding the robot 200 based on, e.g., data from sensor system 225 and other information. Control module 220 generally includes instructions that when executed by the one or more processors 205 cause the one or more processors 205 to control the operation of robot 200. This is based, at least in part, on the information about the environment obtained from perception module 215.

As shown in FIG. 2, robot 200 can communicate with other network nodes 175 (servers, client computers, mobile devices, other robots, etc.) via network 170. As also shown in FIG. 2, robot 200 includes a sensor system 225 to perceive its environment and one or more actuators 230 to perform physical tasks and otherwise interact with its environment (e.g., to navigate, stop/go, accelerate, decelerate, steer, maneuver, grasp objects, etc.).

In some embodiments, robot 200 can receive (e.g., via network 170) optimized control policies 160 learned on a final reward function 165 at reward function comparison system 100 so that robot 200 can be controlled, at least in part, in accordance with the optimized control policies 160. In other embodiments, robot 200 can receive (e.g., via network 170) and execute a planning algorithm provided by reward function comparison system 100 that includes a final reward function 165. Robot 200 can then be controlled, at least in part, in accordance with the planning algorithm. For example, an autonomous vehicle uses a planning algorithm to select its trajectory and to make other important operational decisions from moment to moment as it travels on a roadway.

As discussed above, the techniques described herein have wide applicability to different aspects of a variety of different kinds of robots 200. For example, in some embodiments, the robot 200 is a manually driven vehicle equipped with an ADAS or other system that performs analytical and decision-making tasks to assist a human driver. In other embodiments, the robot 200 is an autonomous vehicle. In still other embodiments, the robot 200 can be a mobile or fixed indoor robot (e.g., a service robot, hospitality robot, companionship robot, manufacturing robot, etc.). In still other embodiments, the robot 200 can be an autonomous or semi-autonomous aerial drone.

As discussed above, the dynamics-aware transformation 145 transforms reward functions into a form allowing for reward-shaping-invariant comparisons while ensuring that learned reward functions are only evaluated on transitions that are physically realizable. This is achieved through the use of a transition model for the environment of interest and evaluating reward functions on transitions sampled from the transition model. This ensures that reward functions are not evaluated on impossible transitions, which will necessarily be OOD. This is well motivated in a variety of physical environments in which transition models are unlikely to change significantly between learning and deployment. This description next turns to a more detailed discussion of the underlying mathematical concepts and principles involved in effectively comparing reward functions.

Markov Decision Processes. A Markov decision process (MDP) is a tuple $(\mathcal{S}, \mathcal{A}, T, R, \gamma, d_0)$, where $\mathcal{S}$ and $\mathcal{A}$ are the state and action spaces, respectively. The transition model $T: \mathcal{S} \times \mathcal{A} \times \mathcal{S} \to [0,1]$ maps a state and action to a probability distribution over next states, and the reward function $R: \mathcal{S} \times \mathcal{A} \times \mathcal{S} \to \mathbb{R}$ measures the quality of a transition. Finally, $\gamma \in [0,1]$ and $d_0$ are, respectively, the discount factor and initial state distribution. A trajectory $\tau$ consists of a sequence of state-action pairs: $\tau = \{(s_0, a_0), (s_1, a_1), \ldots\}$, and the return g of a trajectory is defined as the sum of discounted rewards along that trajectory: $g(\tau) = \Sigma_{t=0}^{\infty} \gamma^t R(s_t, a_t, s_{t+1})$. The goal in a MDP is to find a policy $\pi: \mathcal{S} \times \mathcal{A} \to [0,1]$ that maximizes the expected return, $\mathbb{E}[g(\tau)]$, where $s_0 \sim d_0$, $a_t \sim \pi(a_t|s_t)$, and $s_{t+1} \sim T(s_{t+1}|s_t, a_t)$. The distribution over a space $\mathcal{S}$ is denoted as $\mathcal{D}_\mathcal{S}$ and the set of distributions over a space $\mathcal{S}$ is denoted as $\Delta(\mathcal{S})$. To simplify the notation below, a prime is used to indicate the next time step to hide the time subscript. Thus, $s_t$ is written as s, $s_{t+1}$ as s', and $s_{t+2}$ as s".

Reward Function Equivalence. As discussed above, one objective is to define a metric for comparing reward functions without having to learn policies. Nevertheless, the measure of similarity that is of interest is the extent to which the optimal policies induced by two different reward functions are the same. Because different reward functions can induce the same set of optimal policies, what is actually sought is a "pseudometric," as formalized in the following definition. Definition 1 (Pseudometric). Let $\mathcal{X}$ be a set and d: $\mathcal{X} \times \mathcal{X} \to [0, \infty]$ a function. The function d is a premetric if $d(x,x)=0$ for all $x \in \mathcal{X}$. The function d is a pseudometric if, furthermore, it is symmetric, $d(x,y)=d(y,x)$ for all $x,y \in \mathcal{X}$; and satisfies the triangle inequality, $d(x,z) \leq d(x,y)+d(y,z)$ for all $x,y,z \in \mathcal{X}$. The function d is a metric if, furthermore, for all x, $y \in \mathcal{X}$, $d(x,y)=0 \Rightarrow x=y$.

One might ask which rewards induce the same set of optimal policies. It has been shown that without additional prior knowledge about the MDP, only reward functions that are related through a difference in state potentials are equivalent. This "reward shaping" refers to an additive transformation F applied to an initial reward function R to compute a shaped reward R': R'(s, a, s')=R(s, a, s')+F(s, a, s'). Reward shaping is typically applied in a reward design setting to produce denser reward functions that make policy optimization easier in practice. It has been shown that if F is of the form F(s, a, s')=γΦ(s')−Φ(s) for an arbitrary state potential function Φ(s), the set of optimal policies under R and R' are the same. This leads to the following definition for reward equivalence. Definition 2 (Reward Equivalence). Bounded rewards $R_A$ and $R_B$ are equivalent if and only if ∃λ>0 and Φ: $\mathcal{S} \rightarrow \mathbb{R}$ bounded such that $R_B$(s, a, s')=λ$R_A$(s,a,s')+γΦ(s')−Φ(s) ∀s,s'∈$\mathcal{S}$, a∈$\mathcal{A}$.

This form of equivalence is possible in reward functions that depend on (s, a, s'), which is the focus of the various embodiments described herein. This choice is further motivated by the fact that there are cases in which conditioning on the next state s' can make reward learning simpler, for example in highly stochastic MDPs, or in cases in which rewards are a simple function of (s, a, s') but not of (s,a). Another definition that will be referenced below is the Pearson distance between two random variables. Definition 3 (Pearson Distance). The Pearson distance between random variables X and Y is defined by the expression $D_\rho(X,Y)=\sqrt{1-\rho(X,Y)}/\sqrt{2}$, where ρ(X,Y) is the Pearson correlation between X and Y.

Dynamics-Aware Reward Distance. A new distance measure between reward functions is needed that leverages information about system dynamics to prevent errors due to OOD queries of learned reward functions, in particular. Such a distance measure is presented below (see Definition 5). This new distance measure incorporates a transition model of the environment in which a particular type of robot functions (this transition model can itself be learned, in some embodiments). The various embodiments of a reward function comparison system 100 described herein compute an alternative reward transformation (i.e., dynamics-aware transformation 145, defined below in Definition 4), which is different from the transformations described in the prior art. One important difference is that the dynamics-aware transformation 145 evaluates reward functions on transitions that are much closer to those observed in the environment through use of the transition model. This facilitates the evaluation of reward functions closer to the distribution of transitions on which they were trained while still providing a distance metric between reward functions that is invariant to potential shaping. Definition 4 (Dynamics-Aware Transformation). Let R: $\mathcal{S} \times \mathcal{A} \times \mathcal{A} \rightarrow \mathbb{R}$ be a reward function. Given distributions $\mathcal{D}_S \in \Delta(\mathcal{S})$ and $\mathcal{D}_\mathcal{A} \in \Delta(\mathcal{A})$ over states and actions, let S be a random variable distributed as $\mathcal{D}_S$ and A be a random variable distributed as $\mathcal{D}_\mathcal{A}$. Furthermore, given a probabilistic transition model defining a conditional distribution over next states T(S'|S,A), let S' and S'' be random variables distributed as T(S'|s, A) and T(S''|s', A), respectively. Define the dynamics-aware transformation of R as follows:

$$C_T(R)(s,a,s')=R(s,a,s')+\mathbb{E}[\gamma R(s',A,S'')-R(s,A,S')-\gamma R(S',A,S'')].$$

By sampling next states from the transition model conditioned on the current state (either s or s'), the above transformation evaluates reward models at (s, a, s') transitions that are closer to their training distribution. Regarding the term $\mathbb{E}[R(S', A, S'')]$, the transitions evaluated are not perfectly in-distribution with respect to T. This is because S'' is distributed conditionally on the original s' instead of the random variable S'. These transitions are nevertheless much closer to physically realizable than those sampled in conventional methods. It can be shown that learned reward functions are relatively insensitive to these slight errors, in practice. The distribution $\mathcal{D}_\mathcal{A}$ is selected to densely cover the space of possible actions. This is done because, during policy optimization, policies may select a wide range of possible actions, resulting in evaluating learned reward functions on this same distribution of actions. Informally, the above transformation in Definition 4 normalizes the reward values of a transition (s, a, s') based on the reward values of nearby transitions sampled from the transition model. This normalization permits a comparison between reward functions that is invariant to potential shaping.

Proposition 1 (The dynamics-aware transformed reward function is invariant to shaping). Let R: $\mathcal{S} \times \mathcal{A} \times \mathcal{S} \rightarrow \mathbb{R}$ be a reward function, and Φ: $\mathcal{S} \rightarrow \mathbb{R}$ a state potential function. Let γ∈[0,1] be a discount factor, and $\mathcal{D}_S \in \Delta(\mathcal{S})$ and $\mathcal{D}_\mathcal{A} \in \Delta(\mathcal{A})$ be distributions over states and actions, and T: $\mathcal{S} \times \mathcal{A} \rightarrow \Delta(\mathcal{S})$ be a conditional distribution over next states. Let R' denote R shaped by Φ: R'(s, a, s')=R(s, a, s')+γΦ(s')−Φ(s). Then the transition-relative transformations of R' and R are equal: $C_T(R')=C_T(R)$.

Definition 5 (Dynamics-Aware Distance Measure). Let S, A, S' be random variables jointly following some coverage transition distribution, and let T be the transition model of the corresponding environment. A dynamics-aware pseudometric between reward functions $R_A$ and $R_B$ is defined as follows:

$$D_{DARD}(R_A,R_B)=D_\rho(C_T(R_A)(S,A,S'),C_T(R_B)(S,A,S')).$$

In the above definition, the acronym "DARD" stands for "Dynamics-Aware Reward Distance." This is the pseudometric 150 discussed above.

Figure 3:
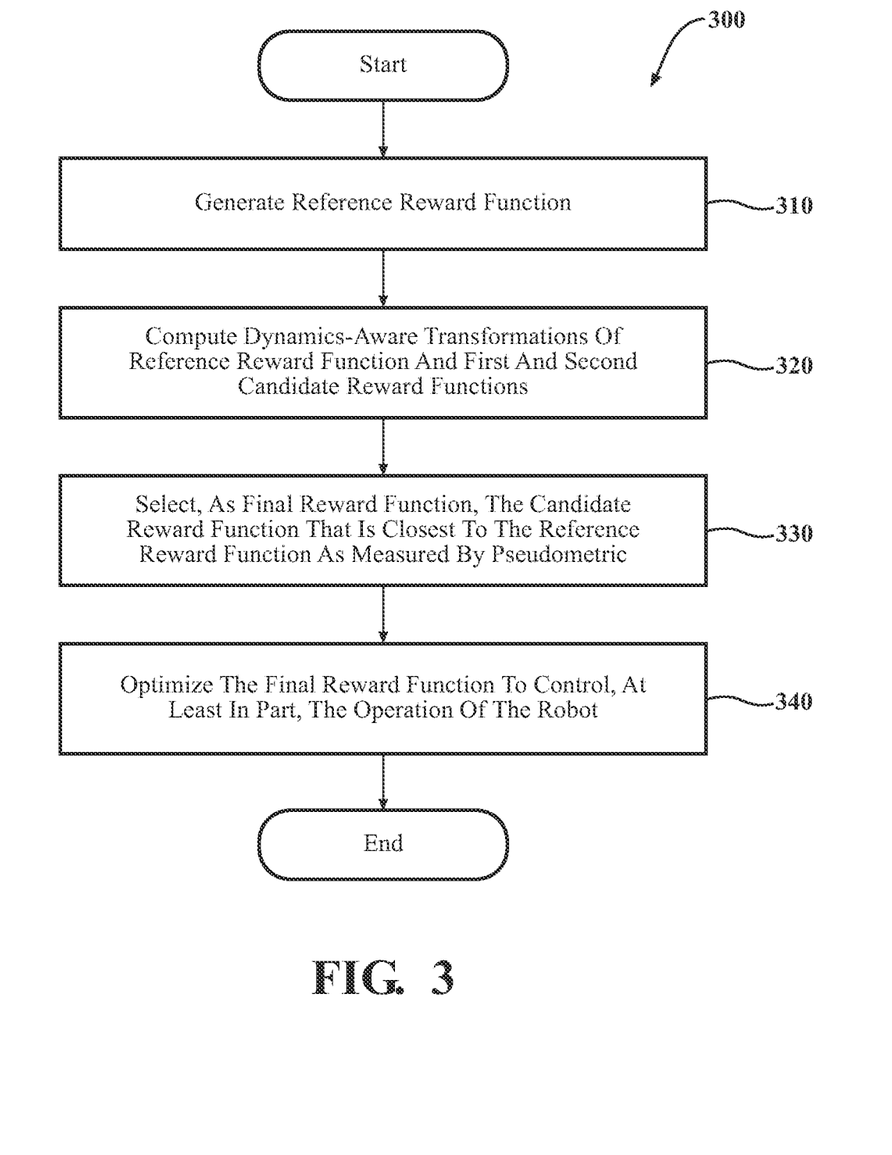
FIG. 3 is a flowchart of a method of dynamics-aware comparison of reward functions, in accordance with an illustrative embodiment of the invention.

This description next turns to a discussion of the methods associated with a reward function comparison system employing the techniques discussed above. FIG. 3 is a flowchart of a method 300 of dynamics-aware comparison of reward functions, in accordance with an illustrative embodiment of the invention. Method 300 will be discussed from the perspective of reward function comparison system 100 in FIG. 1. While method 300 is discussed in combination with reward function comparison system 100, it should be appreciated that method 300 is not limited to being implemented within reward function comparison system 100, but reward function comparison system 100 is instead one example of a system that may implement method 300.

At block 310, reference generation module 115 generates a reference reward function 140. As discussed above, in some embodiments, the reference reward function 140 is generated by labeling a relatively small portion of a large dataset. The reference reward function 140 represents a baseline for comparison-a "good" reward function against which other candidate reward functions (e.g., learned reward functions) can be compared and evaluated.

At block 320, transformation module 120 computes a dynamics-aware transformation 145 (see Definition 4 above) of each of the following: (1) the reference reward function 140, (2) a first candidate reward function 143, and (3) a second candidate reward function 143. These dynamics-aware transformations 145, which are based on a transition model of the environment of the target robot, map a state and action to a probability distribution over next states, as discussed above. As discussed above, in some embodiments, at least one of the first and second candidate reward functions 143 is a learned reward function (e.g., learned via IRL). In other embodiments, one or both of the first and second candidate reward functions is a closed-form reward function.

At block 330, comparison module 125 selects, as a final reward function 165, whichever of the first candidate reward function 143 and the second candidate reward function 143 is closer to the reference reward function 140, as measured by a first pseudometric 150 (see Definition 5 above) computed between the dynamics-aware transformation 145 of the first candidate reward function 143 and the dynamics-aware transformation 145 of the reference reward function 140 and a second pseudometric 150 (see Definition 5 above) computed between the dynamics-aware transformation 145 of the second candidate reward function 143 and the dynamics-aware transformation 145 of the reference reward function 140. In some embodiments, in computing the first and second pseudometrics 150, comparison module 125 evaluates the reference reward function 140, the first candidate reward function 143, and the second candidate reward function 143 only at physically realizable state transitions. This obviates the problem of OOD samples that plagues some of the conventional approaches to comparing reward functions, as discussed above.

At block 340, optimization module 130 optimizes the final reward function 165 to control, at least in part, operation of a robot 200. As discussed above, the term "optimizing the final reward function 165" can mean different things, depending on the particular embodiment. In some embodiments, it means learning an optimized control policy 160 for a task in a parameterized model 155 using the final reward function 165. For example, in some embodiments, the parameterized model 155 includes one or more neural networks. In other embodiments, the parameterized model 155 includes a colinear function of a set of features. Once the weights and parameters of the parameterized model 155 have been established through a training process, those weights and parameters can be transferred (e.g., transmitted over network 170) to the target robot 200, and the robot 200 can be controlled, at least in part, in accordance with the optimized control policy 160. In other embodiments, "optimizing the final reward function 165" means that optimization module 130 includes the final reward function 165 in a planning algorithm of the robot (i.e., in program code that is ultimately transferred to and installed in the robot). For example, as discussed above, an autonomous vehicle uses a planning algorithm to select its trajectory and to make other important operational decisions from moment to moment as it travels on a roadway.

As discussed above, the various embodiments described herein have wide applicability to different aspects of a variety of different kinds of robots 200. For example, in some embodiments, the robot 200 is a manually driven vehicle equipped with an ADAS or other system that performs analytical and decision-making tasks to assist a human driver. In other embodiments, the robot 200 is an autonomous vehicle capable of operating at, e.g., Autonomy Levels 3-5. In this context, "autonomous vehicle" encompasses specialized outdoor robots such as search-and-rescue robots and delivery robots. In still other embodiments, the robot 200 can be a mobile or fixed indoor robot (e.g., a service robot, hospitality robot, companionship robot, manufacturing robot, etc.). In still other embodiments, the robot 200 can be an autonomous or semi-autonomous aerial drone. As also discussed above, in some embodiments, comparison module 125, in computing the first pseudometric 150 and the second pseudometric 150 (see Definition 5 above), evaluates the reference reward function 140, the first candidate reward function 143, and the second candidate reward function 143 only at physically realizable state transitions.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-3, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims rather than to the foregoing specification, as indicating the scope hereof.

What is claimed is:

1. A system for dynamics-aware comparison of reward functions, the system comprising:
   a processor; and
   a memory storing instructions that, when executed by the processor, cause the processor to:
   generate a reference reward function as a baseline for comparison with other reward functions;
   convert the reference reward function, a first candidate reward function, and a second candidate reward function to a canonical form by computing, for each, a dynamics-aware transformation based on a transition model that models dynamics of an environment in which a robot functions, wherein the reference reward function and the first and second candidate reward functions pertain to a same task of the robot;
   select, as a final reward function, whichever of the first candidate reward function and the second candidate reward function is closer to the reference reward function as measured by a pseudometric computed between the dynamics-aware transformation of the reference reward function and the dynamics-aware transformation of each of the first and second candidate reward functions;
   optimize the final reward function; and
   control, at least in part, operation of the robot based on the optimized final reward function.

2. The system of claim 1, wherein the instructions to optimize the final reward function include instructions that cause the processor to perform one of learning an optimized control policy in a parameterized model using the final reward function and including the final reward function in a planning algorithm of the robot.

3. The system of claim 2, wherein the parameterized model includes one of one or more neural networks and a colinear function of a set of features.

4. The system of claim 1, wherein the robot is one of a manually driven vehicle, an autonomous vehicle, an indoor robot, and an aerial drone.

5. The system of claim 1, wherein at least one of the first candidate reward function and the second candidate reward function is a learned reward function.

6. The system of claim 5, wherein the at least one of the first candidate reward function and the second candidate reward function that is a learned reward function is learned via inverse reinforcement learning.

7. The system of claim 1, wherein the instructions to compute the pseudometric cause the processor to evaluate the reference reward function, the first candidate reward function, and the second candidate reward function only at physically realizable state transitions.

8. The system of claim 1, wherein the transition model maps a state and action to a probability distribution over next states.

9. A non-transitory computer-readable medium for dynamics-aware comparison of reward functions and storing instructions that, when executed by a processor, cause the processor to:
   generate a reference reward function as a baseline for comparison with other reward functions;
   convert the reference reward function, a first candidate reward function, and a second candidate reward function to a canonical form by computing, for each, a dynamics-aware transformation based on a transition model that models dynamics of an environment in which a robot functions, wherein the reference reward function and the first and second candidate reward functions pertain to a same task of the robot;
   select, as a final reward function, whichever of the first candidate reward function and the second candidate reward function is closer to the reference reward function as measured by a pseudometric computed between the dynamics-aware transformation of the reference reward function and the dynamics-aware transformation of each of the first and second candidate reward functions;
optimize the final reward function; and
control, at least in part, operation of the robot based on the optimized final reward function.

10. The non-transitory computer-readable medium of claim 9, wherein the instructions to optimize the final reward function include instructions that cause the processor to perform one of learning an optimized control policy in a parameterized model using the final reward function and including the final reward function in a planning algorithm of the robot.

11. The non-transitory computer-readable medium of claim 10, wherein the parameterized model includes one of one or more neural networks and a colinear function of a set of features.

12. The non-transitory computer-readable medium of claim 9, wherein the instructions to compute the pseudometric include instructions that cause the processor to evaluate the reference reward function, the first candidate reward function, and the second candidate reward function only at physically realizable state transitions.

13. A method comprising:
generating a reference reward function as a baseline for comparison with other reward functions;
converting the reference reward function, a first candidate reward function, and a second candidate reward function to a canonical form by computing, for each, a dynamics-aware transformation based on a transition model that models dynamics of an environment in which a robot functions, wherein the reference reward function and the first and second candidate reward functions pertain to a same task of the robot;
selecting, as a final reward function, whichever of the first candidate reward function and the second candidate reward function is closer to the reference reward function as measured by a pseudometric computed between the dynamics-aware transformation of the reference reward function and the dynamics-aware transformation of each of the first and second candidate reward functions;
optimizing the final reward function; and
controlling, at least in part, operation of the robot based on the optimized final reward function.

14. The method of claim 13, wherein optimizing the final reward function includes one of learning an optimized control policy in a parameterized model using the final reward function and using the final reward function in a planning algorithm of the robot.

15. The method of claim 14, wherein the parameterized model includes one of one or more neural networks and a colinear function of a set of features.

16. The method of claim 13, wherein the robot is one of a manually driven vehicle, an autonomous vehicle, an indoor robot, and an aerial drone.

17. The method of claim 13, wherein at least one of the first candidate reward function and the second candidate reward function is a learned reward function.

18. The method of claim 17, wherein the at least one of the first candidate reward function and the second candidate reward function that is a learned reward function is learned via inverse reinforcement learning.

19. The method of claim 13, wherein the pseudometric evaluates the reference reward function, the first candidate reward function, and the second candidate reward function only at physically realizable state transitions.

20. The method of claim 13, wherein the transition model maps a state and action to a probability distribution over next states.

* * * * *